Jan. 26, 1965   J. W. AGER, JR., ETAL   3,167,584
ORGANOBORON MONO AND DICARBOXYLIC ACIDS AND THEIR PREPARATION
Filed April 28, 1959
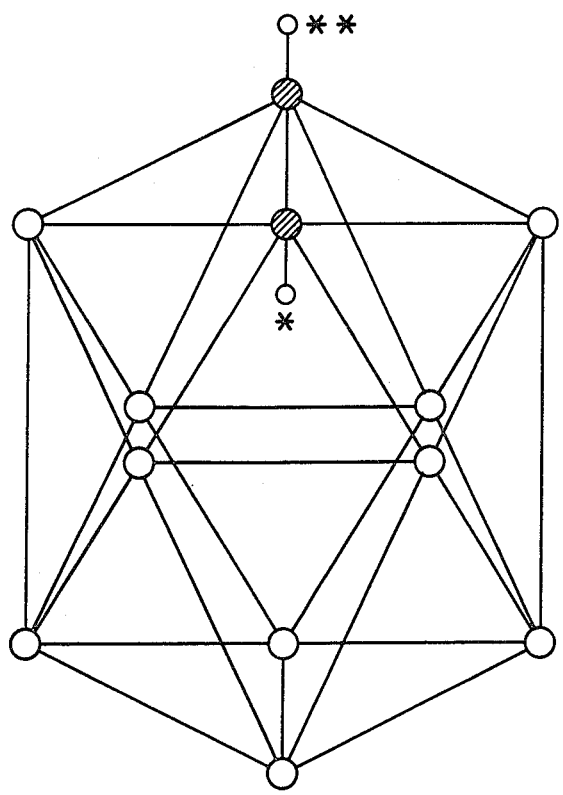
○ Boron
◉ Carbon
○ Hydrogen on Carbon
   (Hydrogen atoms on
   boron omitted for
   clarity)
*INVENTORS*
JOHN W. AGER, JR.
ROY P. ALEXANDER
BY THEODORE L. HEYING
ATTORNEYS 3,167,584
ORGANOBORON MONO AND DICARBOXYLIC ACIDS AND THEIR PREPARATION
John W. Ager, Jr., Buffalo, Roy P. Alexander, Lewiston, and Theodore L. Heying, Tonawanda, N.Y., assignors to Olin Mathieson Chemical Corporation
Filed Apr. 28, 1959, Ser. No. 809,569
11 Claims. (Cl. 260—526)

This invention relates to organoboron carboxylic acids and to a method for their preparation. The organoboron carboxylic acids are prepared by reacting successively with an alkali metal alkyl or aryl, carbon dioxide, and an aqueous solution of a mineral acid, a compound of the class $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen, an alkyl radical and a monoalkenyl hydrocarbon radical, at least one of R'' and R''' being hydrogen, and the total number of carbon atoms in R'' and R''' taken together not exceeding eight.

Compounds of the above class can be prepared by the reaction of decaborane or an alkylated decaborane having one to two alkyl groups containing 1 to 5 carbon atoms in each alkyl group with an acetylenic hydrocarbon containing from two to ten carbon atoms in the presence of a wide variety of ethers, nitriles or amines. The preparation of these compounds is described in application Serial No. 741,976, filed June 13, 1958, of Ager, Heying and Mangold, now abandoned. For example, $B_{10}H_{10}(CHCH)$ can be prepared by reacting for about 12 hours at 125° C. a mixture of decaborane and tetrahydrofuran in an autoclave pressured to 100 p.s.i. with acetylene.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, now Patent 2,999,117, by Elmar Altwicker, Alfred B. Garrett, Samuel W. Harris and Earl A. Weilmuenster.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this invention can be used as fuels according to the method described in the above application Serial No. 497,407. A major advantage of these new liquid products is the high stability they exhibit at elevated temperatures. One of the shortcomings of many high energy fuels is their limited stability at the high temperatures sometimes encountered in their use. The liquid products prepared by the method of this invention, however, exhibit relatively little decomposition even after having been maintained at elevated temperatures for extended periods, thus rendering them well suited for more extreme conditions of storage and use. The liquid products of this invention are also of high density.

In accordance with the present invention, it was discovered that compounds of the above class can be reacted successively with an alkali metal alkyl or aryl, carbon dioxide, and an aqueous solution of a mineral acid to produce organoboron carboxylic acids.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium, and the like, since they are soluble in inert organic solvents. Other alkali metal alkyls, such as the sodium and potassium alkyls, however, can also be employed as can the alkali metal aryls including phenyl lithium.

The ratio of reactants can vary widely, generally being within the range of from 0.1 to 10 moles of alkali metal alkyl per mole of organoboron compound and preferably in the range of from 1 to 3 moles of alkali metal alkyl per mole of organoboron compound. The temperature of the reaction of the organoboron compound with the alkali metal alkyl is generally maintained between —90° C. and 50° C. and preferably at or below room temperature. The pressure employed can vary widely, although atmospheric pressure reactions are convenient. The reaction of the alkali metal alkyl with the organoboron compound is substantially instantaneous. Slow addition of the alkali metal alkyl to the reaction mixture is practiced to prevent overheating.

The amount of carbon dioxide employed can also be varied widely, and a large molar excess, such as a ten-fold excess or higher, is preferably employed to favor complete carbonation of the organoboron compound. The carbonation reaction in a sealed system at greater than atmospheric pressure is conveniently conducted at room temperature, while atmospheric pressure carbonation is usually cooled to remove the heat of reaction. The pressure employed can vary widely, generally being in the range of from 0.1 to 30 atmospheres, although the reaction proceeds well at atmospheric pressure. The carbonation reaction proceeds rapidly, and addition of carbon dioxide is usually completed in about 0.1 to 3 hours at atmospheric pressure. Carbonation reactions at superatmospheric pressure may be allowed to continue for up to 20 days.

The organoboron carboxylic acid is liberated by hydrolyzing the carbonation mixture with an aqueous solution of a mineral acid such as hydrochloric acid, sulfuric acid, nitric acid, and the like. The organoboron carboxylic acid is then isolated by extraction with a suitable solvent, such as diethyl ether, drying the extract, and removing the solvent under reduced pressure.

The process of the invention is illustrated in detail by the following examples. In the examples, the term "moles" signifies gram moles.

*Example I*

1 g. of lithium (0.145 mole) was reacted with 8 g. (0.054 mole) of n-butylbromide in 30 ml. of diethylether at $-10°$ C. The reaction took about 2 hours. The reaction mixture was filtered and cooled to 0° C., and to the butyl lithium so prepared were added 3 g. (0.021 mole) of $B_{10}H_{10}(CHCH)$ in 20 ml. of diethyl ether. The mixture was allowed to come to room temperature. A precipitate formed. The mixture was put in a 500 ml. Hoke cylinder, pressured to 600 p.s.i.g. with $CO_2$, and allowed to stand at room temperature for 36 hours. The excess $CO_2$ was then bled off and the ether solution was poured from the cylinder. There was no precipitate. The ether solution was extracted with 100 ml. of water and the water solution was acidified with hydrochloric acid. An oil formed and was extracted with diethylether. The ether solution was dried over $MgSO_4$ and the ether removed by distillation. The residue was an oil which, on being placed in a vacuum desiccator for 4 hours, turned to a white pasty solid. This solid was placed in 75 ml. of heptane and the heptane was heated to boiling. Benzene was then added to the boiling solution until the solid dissolved. After cooling to room temperature, the solution was filtered to give 1.5 g. of white crystals having a melting point of 232° to 233° C.

Found: 45.8, 47.4 percent boron. Calculated for $B_{10}H_{10}[C(COOH)]_2$: 46.6 percent boron.

0.1286 g. of the acid was titrated with 0.1088 N NaOH. Used: 1.099 equivalents. Required for

$B_{10}H_{10}[C(COOH)]_2$ 1.109 equivalents.

Mass spectrographic analysis showed $CO_2$ and

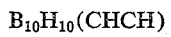

$B_{10}H_{10}(CHCH)$

Example II 19 g. (0.13 mole) of $B_{10}H_{10}(CHCH)$ and 100 ml. of diethyl ether were added to 0.30 mole of n-butyl lithium in 100 ml. of diethylether at $-20°$ C. The reaction mixture at $-20°$ C. was placed in a 500 ml. Hoke cylinder and allowed to stand at room temperature overnight. $CO_2$ was added with shaking until the residual pressure was 300 p.s.i.g. The mixture stood for 5 days at room temperature. The contents of the cylinder were poured into a 1-liter beaker and carefully hydrolyzed with 200 ml. of water. The water solution was separated and acidified with HCl. The precipitated oil was extracted with diethylether and the ether solution was dried over $MgSO_4$ and distilled. The residual oil was placed under evacuation until it solidified. The solid was heated to 100° C. in about 500 ml. of heptane and toluene was added to the hot solution until the solid dissolved. After cooling, the solution was filtered to give 16.5 g. (53 percent) of $B_{10}H_{10}[C(COOH)]_2$ having a melting point of 220° to 225° C. (slightly impure).

Example III

A 2-liter 3 neck flask was fitted with a Dry Ice condenser and a 1-liter dropping funnel for the preparation of methyl lithium. Prior to reaction with methyl iodide, the lithium shot was washed twice with ether. A quantity of 28 g. (4.0 moles) of the washed lithium shot was placed in the flask and covered with 480 ml. of diethylether. Over a period of 4 hours, 240 g. (1.69 moles) of methyl iodide dissolved in 480 ml. of ether were added dropwise with magnetic stirring to the lithium suspension. It was occasionally necessary to cool the reaction flask with Dry Ice. The reaction flask was allowed to stand overnight prior to the next stage. During and after the reaction an appreciable quantity of solids, violet in color, settled to the bottom of the reaction flask. Approximately 400 ml. of the methyl lithium solution were transferred to a 500 ml. dropping funnel. The majority of the violet colored solids were drawn off before reaction of the methyl lithium with the $B_{10}H_{10}(CHCH)$.

A quantity of 19 g. (0.13 mole) of $B_{10}H_{10}(CHCH)$ was dissolved in 300 ml. of diethyl ether in a 1-liter 3 neck round bottom flask fitted with a 500 ml. dropping funnel and a Dry Ice-acetone condenser. A wet test meter in series with two Dry Ice traps was connected to the reaction flask through the Dry Ice acetone condenser for the purpose of measuring evolved gas. The system initially was purged with dry nitrogen prior to the addition of the methyl lithium solution. This solution was added dropwise with magnetic stirring to the ether solution of $B_{10}H_{10}(CHCH)$ over a period of approximately 10 hours. The addition was discontinued after 6 hours and the reaction was stirred overnight for 16 hours. Addition then was continued for another 4 hours at which time gas evolution had virtually ceased. A total of 6.4 liters of gas identified as methane were liberated during the reaction. In all, 260 ml. of the methyl lithium solution were added to the $B_{10}H_{10}(CHCH)$ ether solution.

The products of the above reaction in either solution were transferred under a nitrogen atmosphere to a 1200 ml. Hoke Aminco cylinder fitted with a Crosby 600 p.s.i.g. gauge and ¼ inch Hoke valve. The cylinder was cooled in Dry Ice and then filled directly from a carbon dioxide cylinder to a pressure of 300 to 350 p.s.i.g. at room temperature. The solution was stirred periodically by means of magnetic stirring. The total residence time in contact with the carbon dioxide was about 16 days. The solution next was poured over 500 g. of ice and hydrolyzed with constant stirring for about 2 hours. The ether layer was separated from the aqueous layer in a 1-liter separatory funnel and rehydrolyzed with approximately 500 ml. of water. The aqueous layers were acidified with dilute hydrochloric acid. In each case, a dark brown oil floated to the surface. The aqueous layers each were extracted 3 times with diethylether. The ether extracts were combined and dried over anhydrous sodium sulfate. The residue left on vaporation of the ether was dissolved in hot benzene and then slowly poured with constant stirring into cold pentane. This procedure precipitated a crystalline white solid which was filtered and washed with cold pentane. More of the crude acid was obtained by the addition of pentane to the filtrate. The yield of discarboxylic acid $[B_{10}H_{10}C_2(COOH)_2]$ obtained was 16 g. representing an overall yield of 53 percent. A purer sample of the acid obtained by recrystallization from a benzene-pentane mixture had a melting point of 230° to 232° C. (melting point block). This product was combined with other batches and found by chemical analysis to have the following composition:

*Analysis of Composite.*—Found (percent): B, 45.9; C, 22.2; H, 6.04. Calculated for $B_{10}H_{10}C_2(COOH)_2$ (percent): B, 46.5; C, 20.7; H, 5.2.

Example IV

The preparation of methyl lithium was carried out in a 3 neck 1-liter flask fitted with a Dry Ice condenser and 500 ml. dropping funnel. A quantity of 15 to 16 g. (2.1 moles) of chunk lithium was cut up into fine chips, placed in the aforementioned flask, and covered with 240 ml. of diethyl ether. A solution of 120 g. (0.85 mole) of methyl iodide in 240 ml. of diethyl ether was added dropwise with magnetic stirring to the lithium suspension over a 2 hour period. Throughout the reaction, cooling of the 1-liter reaction flask was necessary to slow down the reaction rate. The mixture was refluxed for another 2 hours after addition of the methyl iodide had been completed.

A quantity of 21 g. of $B_{10}H_{10}(CHCH)$ (0.14 mole) was dissolved in 200 ml. of diethyl ether in a 1-liter 3 neck flask fitted with a Dry Ice condenser and a dropping funnel containing approximately 450 ml. of diethyl ether solution in which was dissolved about 13.0 g. of methyl lithium. This is based on the assumption that the preparation of the methyl lithium resulted in at least a 60 to 70 percent yield. Provision was made to measure the gas evolved by means of a wet test meter which was protected from ether vapors by means of a Dry Ice-alcohol cooled spiral glass trap leading from the Dry Ice condenser to the reaction flask. The reaction flask was cooled to approximately −10° C. with Dry Ice during the slow addition of the methyl lithium solution with magnetic stirring. The reaction proceeded with a steady evolution of gas (identified as methane by infrared analysis) until about 4.0 liters of gas were recorded by the meter. The reaction mixture was then heated up below reflux temperature in order to accelerate the methane evolution. When the wet test meter indicated the evolution of about 6.5 liters of gas, the addition of the methyl lithium solution was halted. About 250 ml. of methyl lithium solution of the original 450 ml. had been added. The reaction mixture was next transferred in a nitrogen atmosphere to a 1200 ml. stainless steel Hoke cylinder fitted with a Crosby gauge and ¼ inch Hoke valve. Excess carbon dioxide was condensed into the cylinder from a vacuum system. When the cylinder was warmed to room temperature, the gauge registered approximately 380 p.s.i.g. The residence time for the carbonation reaction was 7 days.

The dark brown ether solution next was poured over 400 g. of ice with constant stirring. The ether layer was separated from the aqueous layer after several minutes stirring. It was noted that the ether layer was still dark in color. This layer then was mixed with another 400 g. of ice and stirred vigorously for 30 minutes, after which time the ether layer had lightened appreciably. Acidification of the aqueous layers with dilute hydrochloric acid produced an appreciable quantity of a dark brown oil which floated to the surface of the aqueous layer. The oil was separated and the aqueous layer was extracted twice with 150 ml. portions of diethylether. The ether extracts and brown oil were mixed and dried over calcium chloride. Evaporation of the ether solution produced a residue of syrupy consistency. Small portions of this residue were treated with various solvents such as benzene, pentane, and heptane in order to effect solution, but very little of the residue appeared to be soluble.

The residue was dissolved then in a dilute aqueous sodium hydroxide solution. A dark brown residue failed to dissolve and was filtered off. The filtrate was acidified with dilute hydrochloric acid at which time a dark brown oil again separated to the top of the aqueous layer. This oil was solidified by cooling the solution and stirring. The white solid which formed was filtered off, washed with ice water and dried overnight in a desiccator. The melting point of the crude product was 125° to 140° C. A mass spectrometric analysis revealed the monocarboxylic acid $B_{10}H_{10}[C(H)C(COOH)]$, and traces of $B_{10}H_{10}(CHCH)$. The crude material was recrystallized from a benzene-pentane mixture. Approximately 4 g. of acid (melting point 154° to 156° C.) were obtained. A sample submitted for chemical analysis gave the following compositions:

Found (percent): B, 57.1; C, 19.8; H, 6.76. Theoretical (percent): B, 57.4; C, 19.1; H, 6.38.

Example V 34.23 g. (0.25 mole) of n-butyl bromide in diethyl ether were added to 4.3 g. of lithium at −10° C. in 15 minutes. The temperature then was held at −10° to 0° C. for 1 hour with stirring. The resulting mixture was filtered and titrated, giving 0.231 mole of butyl lithium or 92.3 percent yield. 15 g. of $B_{10}H_{10}(CHCH)$ were added at 0° C. to the butyl lithium in 5 minutes, and the mixture was stirred at 0° C. to 15° C. for one-half hour. Then $CO_2$ was bubbled through the solution at 0° C. for 2 hours. The resulting mixture was hydrolyzed with dilute hydrochloric acid and the ether layer separated. The ether layer was extracted with aqueous sodium bicarbonate solution and this solution was acidified with hydrochloric acid and extracted with ether. The ether solution was evaporated and the resulting solid was recrystallized from toluene, giving 21 g. (86.5 percent yield) of $B_{10}H_{10}[C(COOH)]_2$.

The reaction can be carried out in inert solvents other than the diethyl ether employed in the specific examples. Such solvents include dimethyl ether, methyl ethyl ether, diisopropyl ether, di-n-propyl ether, ethyl n-butyl ether, ethylene glycol dimethyl ether, dioxane and tetrahydrofuran.

The compound of the formula

$$B_{10}H_{10}[C(COOH)C(COOH)]$$

prepared according to Examples I, II, III and V has the same structural formula as shown in the accompanying drawing with the exception that the hydrogen atoms indicated by the single and double asterisk are each replaced by the radical —COOH.

The compound of the formula

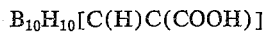

$$B_{10}H_{10}[C(H)C(COOH)]$$

prepared as described in Example IV has the same structural formula as shown in the accompanying drawing with the exception that the hydrogen atom indicated by the single asterisk is replaced by the radical —COOH.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a boro-hydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparision with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as air-craft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operation with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvement in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

We claim:

1. A method for the preparation of an organoboron carboxylic acid useful as a fuel which includes reacting successively with an alkali metal lower alkyl, carbon dioxide, and an aqueous solution of a mineral acid, a compound of the class $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen and a lower alkyl radical, not exceeding eight carbon atoms, at least one of R'' and R''' being hydrogen, the molar ratio of said material to said compound being within the range from 0.1 to 10.1.

2. The method of claim 1 wherein the alkali metal alkyl is a lithium alkyl.

3. The method of claim 1 wherein the alkali metal alkyl is methyl lithium.

4. The method of claim 1 wherein the alkali metal is n-butyl lithium.

5. The method of claim 1 wherein the said compound is $B_{10}H_{10}(CHCH)$.

6. The method of claim 1 wherein the mineral acid is hydrochloric acid.

7. The method of claim 1 wherein the said compound is $B_{10}H_{10}(CHCH)$, the alkali metal alkyl is methyl lithium, and the mineral acid is hydrochloric acid.

8. The method of claim 1 wherein the said compound is $B_{10}H_{10}(CHCH)$, the alkali metal alkyl is n-butyl lithium, and the mineral acid is hydrochloric acid.

9. $RR'B_{10}H_8(CR''CR''')$ wherein R and R' are each selected from the class consisting of hydrogen and an alkyl radical containing from 1 to 5 carbon atoms and wherein R'' and R''' are each selected from the class consisting of hydrogen and a carboxyl radical, at least one of R'' and R''' being a carboxyl radical, having the structural formula of the type shown in the accompanying drawing.

10. $B_{10}H_{10}[C(H)C(COOH)]$ having the structural formula of the type shown in the accompanying drawing.

11. $B_{10}H_{10}[C(COOH)C(COOH)]$ having the structural formula of the type shown in the accompanying drawing.

No references cited.

LEON ZITVER, *Primary Examiner*.

LEON D. ROSDOL, CARL D. QUARFORTH, SAMUEL BOYD, *Examiners*.